United States Patent
Foshee

(10) Patent No.: US 10,464,034 B2
(45) Date of Patent: Nov. 5, 2019

(54) FLUIDIZED SOLIDS DISTRIBUTOR

(71) Applicant: SHELL OIL COMPANY, Houston, TX (US)

(72) Inventor: Robert Todd Foshee, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/572,801

(22) PCT Filed: May 3, 2016

(86) PCT No.: PCT/US2016/030502
§ 371 (c)(1),
(2) Date: Nov. 9, 2017

(87) PCT Pub. No.: WO2016/182786
PCT Pub. Date: Nov. 17, 2016

(65) Prior Publication Data
US 2018/0117556 A1     May 3, 2018

Related U.S. Application Data

(60) Provisional application No. 62/159,544, filed on May 11, 2015.

(51) Int. Cl.
*B01J 8/00*     (2006.01)
*C10G 11/18*     (2006.01)
(Continued)

(52) U.S. Cl.
CPC ............ *B01J 8/0025* (2013.01); *B01J 8/003* (2013.01); *B01J 8/1872* (2013.01); *B01J 8/26* (2013.01);
(Continued)

(58) Field of Classification Search
CPC ........ B01J 8/0025; B01J 8/003; B01J 8/1827; B01J 8/1872; B01J 2208/00752;
(Continued)

(56) References Cited

U.S. PATENT DOCUMENTS 3,995,753 A    12/1976   Millar et al.
4,595,567 A *   6/1986   Hedrick ................... B01J 8/125
                                              122/4 D (Continued)

FOREIGN PATENT DOCUMENTS

EP       0622116 A1    11/1994
EP       0289991 A1    11/1998

OTHER PUBLICATIONS

International Search Report and Written Opinion received for PCT Patent Application No. PCT/US2016/030502, dated Aug. 3, 2016, 11 pages.

*Primary Examiner* — Lessanework Seifu

(57) ABSTRACT

A solids distributor (100) comprising: a solids standpipe (110); a gas line (120); a solids transfer line (130) in fluid communication with the solids standpipe (110) and the gas line (120); and a distributor (140) in fluid communication with the solids transfer line (130). A solids distributor system comprising the a vessel and the solids distributor (100) and a method of distributing fluidized solids.

9 Claims, 4 Drawing Sheets

(51) Int. Cl.
*B01J 8/18* (2006.01)
*B01J 8/26* (2006.01)

(52) U.S. Cl.
CPC ... *C10G 11/182* (2013.01); *B01J 2208/00752* (2013.01); *B01J 2208/00911* (2013.01)

(58) Field of Classification Search
CPC .... B01J 2208/00791; B01J 2208/00911; B01J 2208/00938; C10G 11/182
See application file for complete search history.

(56) References Cited

U.S. PATENT DOCUMENTS

| | | | |
|---|---|---|---|
| 5,773,378 A | 6/1998 | Bussey et al. | |
| 6,221,318 B1 * | 4/2001 | Khouw | B01J 8/0015 34/369 |
| 6,797,239 B1 | 9/2004 | Chen et al. | |
| 7,947,230 B2 * | 5/2011 | Palmas | B01J 8/0055 422/139 |

* cited by examiner

Existing SCD technology

New designed SCD

FLUIDIZED SOLIDS DISTRIBUTOR

PRIORITY CLAIM

The present application is the National Stage (§ 371) of International Application No. PCT/US2016/030502, filed May 3, 2016, which claims priority from U.S. Patent Application No. 62/159544, filed May 11, 2015 incorporated herein by reference.

CROSS-REFERENCE TO RELATED APPLICATIONS

This application claims priority to U.S. Provisional Application Ser. No. 62/159,544 filed May 11, 2015, the entire disclosure of which is hereby incorporated by reference.

BACKGROUND

The present disclosure relates generally to fluidized solids distributors. More specifically, in certain embodiments, the present disclosure relates to spent catalyst distributors useful in fluid catalytic cracking operations and associated methods and systems.

In a typical Fluid Catalytic Cracking Unit (FCCU), finely divided regenerated catalyst may be drawn from a regenerator through a regenerator standpipe and may contact a hydrocarbon feedstock in a lower portion of a reactor riser. Hydrocarbon feedstock and steam may enter the riser through feed nozzles. The mixture of feed, steam and regenerated catalyst, which may have a temperature in the range of from about 200° C. to about 800° C., may pass up through the riser reactor, converting the feed into lighter products while a coke layer may deposit on the surface of the catalyst, temporarily deactivating the catalyst.

The hydrocarbon vapours and catalyst from the top of the riser may then be passed through cyclones to separate spent catalyst from the hydrocarbon vapour product stream. The spent catalyst may enter a stripper where steam may be introduced to remove hydrocarbon products from the catalyst. The spent catalyst may then pass through a spent catalyst transfer line to enter the regenerator where, in the presence of air and at a temperature in the range of from about 620° C. to about 760° C., the coke layer on the spent catalyst may be combusted to restore the catalyst activity. Regeneration may be performed in a fluidized bed. The regenerated catalyst may then be drawn from the regenerator fluidized bed through the regenerator standpipe and, in repetition of the previously mentioned cycle, contact the feedstock in the reactor riser.

Catalyst regeneration is a critical step in FCCU operations. The success of the step may depend on the contacting efficiency between the spent catalyst and oxygen-containing gas in the regenerator. Catalyst may be injected into the regenerator in a number of different ways. One conventional way of introducing catalyst into a regenerator is injecting the catalyst through a side entry port. An example of a conventional device used for introducing catalyst into a regenerator is a spent catalyst inlet device (SCID). Typically, in a SCID system, the spent catalyst is transported to the regenerator in the dense phase. Examples of SCID systems are described in U.S. Pat. No. 6,797,239, the entirety of which is hereby incorporated by reference.

While SCID systems may be effective, such side entry spent catalyst distribution systems may have issues with providing even distribution of spent catalyst within the regenerator. It is desirable to develop an entry system that promotes more even distribution of spent catalyst within the regenerator and also avoids air grid interference.

SUMMARY

The present disclosure relates generally to fluidized solids distributors. More specifically, in certain embodiments, the present disclosure relates to spent catalyst distributors useful in fluid catalytic cracking operations and associated methods and systems.

In one embodiment, the present disclosure provides a solids distributor comprising: a solids standpipe; a gas line; a solids transfer line in fluid communication with the solids standpipe and the gas line; and a distributor in fluid communication with the solids transfer line.

In another embodiment, the present disclosure provides a solids distributor system comprising: a vessel and a solids distributor disposed within the vessel, wherein the solids distributor comprises: a solids standpipe; a gas line; a solids transfer line in fluid communication with the solids standpipe and the gas line; and a distributor in fluid communication with the solids transfer line.

In another embodiment, the present disclosure provides a method of distributing fluidized solids comprising: providing a solids distributor system, wherein the solids distributor system comprises a vessel and a solids distributor disposed within the vessel, wherein the solids distributor comprises: a solids standpipe; a gas line; a solids transfer line in fluid communication with the solids standpipe and the gas line; and a distributor in fluid communication with the solids transfer line and introducing a flow of solids and gas into the vessel.

BRIEF DESCRIPTION OF THE DRAWINGS

A more complete and thorough understanding of the present embodiments and advantages thereof may be acquired by referring to the following description taken in conjunction with the accompanying drawings.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to fluidized solids distributors. More specifically, in certain embodiments, the present disclosure relates to spent catalyst distributors useful in fluid catalytic cracking operations and associated methods and systems.

In certain embodiments, the present disclosure provides a new way to convey fluidized solids within to a vessel. In certain embodiments, the systems and methods discussed herein promote more even distribution of fluidized solids within a vessel than conventional systems and allow for the complete avoidance of any internals in the bottom of the vessel.

Figure 1:
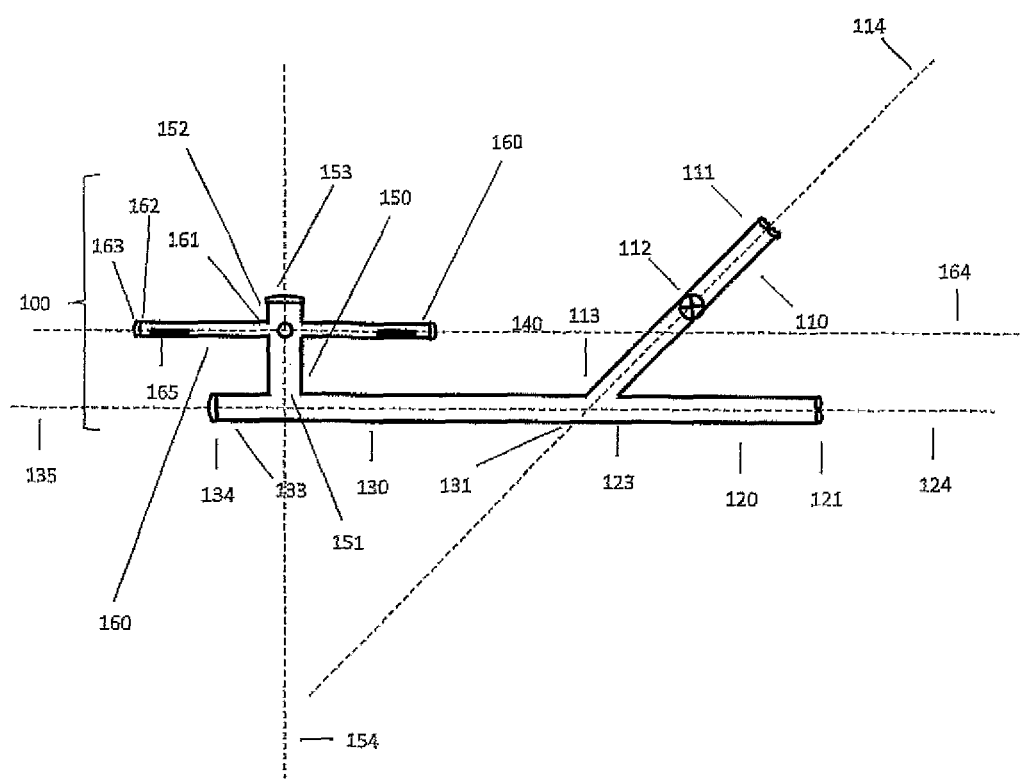
FIG. 1 is an illustration of a fluidized solids distributor in accordance with certain embodiments of the present disclosure.

Referring now to FIG. 1, FIG. 1 illustrates fluidized solids distributor 100 in accordance with certain embodiments of the present disclosure. In certain embodiments, fluidized solids distributor 100 may comprise a spent catalyst distributor for a Fluidized Cracking Catalyst (FCC) regenerator. As can be seen in FIG. 1, in certain embodiments, fluidized solids distributer 100 may comprise solids standpipe 110, gas line 120, solids transfer line 130, and distributor 140. In certain embodiments, solids standpipe 110, gas line 120, solids transfer line 130, and distributor 140 are in fluid communication with each other.

In certain embodiments, solids standpipe 110 may comprise a spent catalyst standpipe. In certain embodiments, solids standpipe 110 may comprise first end 111, valve 112, and second end 113. In certain embodiments, solids standpipe 110 may be constructed of carbon steel or stainless steel. In certain embodiments, solids standpipe 110 may be refractory lined. In certain embodiments, solids standpipe 110 may be sized so that it is capable of receiving a flow of solids. In certain embodiments, the flow of solids may comprise a flow of spent catalyst from an FCC reactor or stripper. In certain embodiments, valve 112 may permit the control of the flow rate of solids through solids standpipe 110. In certain embodiments, solids standpipe 110 may be connected to solids transfer line 130 at second end 113.

In certain embodiments, solids standpipe 110 may be positioned along a central axis 114. In certain embodiments, central axis 114 may be declined from horizontal. In certain embodiments, central axis 114 may be declined at an angle in the range of from 0 degrees to 90 degrees from horizontal. In certain embodiments, central axis 114 may be declined at an angle in the range of from 45 degrees to 90 degrees from horizontal. In certain embodiments, central axis 114 may be declined at an angle in the range of from 0 degrees to 45 degrees from horizontal. In certain embodiments, central axis 114 may be declined at an angle of in the range of from 60 to 90 degrees from horizontal. In certain embodiments, as shown in FIG. 1, central axis 114 may be declined 45 degrees from horizontal.

In certain embodiments, gas line 120 may comprise first end 121 and second end 123. In certain embodiments, gas line 120 may be constructed of carbon steel or stainless steel. In certain embodiments, gas line 120 may be refractory lined. In certain embodiments, gas line 120 may be sized so that it is capable of receiving a flow of gas from a blower or compressor. In certain embodiments, gas line 120 may be connected to solids transfer line 130 at second end 123.

In certain embodiments, gas line 120 may be positioned along a central axis 124. In certain embodiments, central axis 124 may be inclined or declined at an angle in the range of from 0 to 90 degrees with respect to central axis 114. In certain embodiments, central axis 124 may be inclined or declined at an angle in the range of from 60 to 90 degrees with respect to central axis 114. In certain embodiments, central axis 124 may be inclined or declined at an angle in the range of from 0 to 60 degrees with respect to central axis 114. In certain embodiments, central axis 124 may be inclined or declined at an angle in the range of from 0 to 90 degrees with respect to central axis 114. In certain embodiments, as shown in FIG. 1, central axis 124 may be horizontal and/or inclined 45° with respect to central axis 114.

In certain embodiments, solids transfer line 130 may comprise a spent catalyst transfer line. In certain embodiments, solids transfer line 130 may comprise first end 131, second end 133, and cap 134. In certain embodiments, solids transfer line 130 may be constructed of carbon steel or stainless steel. In certain embodiments, solids transfer line 130 may be refractory lined. In certain embodiments, solids transfer line 130 may be sized so that it is capable of receiving a combined flow of the flow of gas and the flow of solids. In certain embodiments, solids transfer line 130 may be connected to gas line 120 and/or solids standpipe 110 at first end 131. In certain embodiments, solids transfer line 130 may be connected to distributor 140 at second end 133.

In certain embodiments, solids transfer line 130 may be positioned along a central axis 135. In certain embodiments, central axis 135 may be in line with central axis 124. In certain embodiments, central axis 135 may be inclined or declined at an angle in the range of from 0 to 90 degrees with respect to central axis 124. In certain embodiments, central axis 135 may be inclined or declined at an angle in the range of from 0 to 45 degrees with respect to central axis 124. In certain embodiments, central axis 135 may be inclined or declined at an angle in the range of from 45 to 90 degrees with respect to central axis 124. In certain embodiments, as shown in FIG. 1, central axis 135 may be horizontal and/or the same as central axis 124.

In certain embodiments, distributor 140 may comprise center conduit 150 and one or more arm conduits 160. In certain embodiments, center conduit 150 may comprise first end 151, second end 152, and end cap 153. In certain embodiments, center conduit 150 may have the same material make up as spent catalyst transfer line 130. In certain embodiments, center conduit 150 may be connected to the one or more arm conduits 160 at second end 152.

In certain embodiments, center conduit 150 may be positioned along a central axis 154. In certain embodiments, central axis 154 may be inclined or declined at an angle in the range of from 0 to 90 degrees with respect to central axis 135. In certain embodiments, central axis 154 may be inclined or declined at an angle in the range of from 0 to 90 degrees with respect to central axis 135. In certain embodiments, central axis may be inclined or declined at an angle in the range of from 0 to 30 degrees with respect to central axis 135. In certain embodiments, central axis may be inclined or declined at an angle in the range of from 45 to 90 degrees with respect to central axis 135. In certain embodiments, central axis may be inclined or declined at an angle in the range of from 30 to 45 degrees with respect to central axis 135. In certain embodiments, as shown in FIG. 1, central axis 154 may be vertical and/or perpendicular to central axis 135.

In certain embodiments, distributor 140 may comprise one, two, three, four, five, six, seven, eight, nine, ten, eleven, or twelve arm conduits 160. In certain embodiments, each of the arm conduits 160 may be equal spaced. In certain embodiments, the one or more arm conduits 160 may be of the same length and size or of different lengths and sizes or any combination thereof. In certain embodiments, the one or more arm conduits 160 may comprise first ends 161, second ends 162, and end caps 163. In certain embodiments, the one or more arm conduits 160 may comprise open ends rather than end caps. In certain embodiments, the one or more arms conduits 160 may have the same material make up as center conduit 150.

In certain embodiments, the one or more arm conduits 160 may be positioned along a central axis 164. In certain embodiments, central axis 164 may be inclined or declined at an angle in the range of from 0 to 90 degrees with respect to central axis 154. In certain embodiments, central axis 164 may be inclined or declined at an angle in the range of from 0 to 45 degrees with respect to central axis 154. In certain embodiments, central axis 164 may be inclined or declined at an angle in the range of from 45 to 90 degrees with respect to central axis 154. In certain embodiments, as shown in FIG. 1, central axis 164 may be horizontal and/or perpendicular to central axis 154.

In certain embodiments, the one or more arm conduits 160 may comprise slots 165. In certain embodiments, slots 165 may be disposed on the bottom, top, and/or side of arm conduits 160. In certain embodiments, each of the one or more arm conduits 160 may comprise a slot 165. In certain embodiments, slots 165 may have a geometric profile. In certain embodiments, the geometric profile may be rectangular, triangular, or oval shaped. In certain embodiments, the geometric profile may be a combination of any shape with sharp or rounded corners. In other embodiments, slots 165 may have a tapered geometry. In other embodiments, the one or more arm conduits 160 may comprise one or more nozzles in place of slots 165. In certain embodiments, the configuration of slots 165 and/or the nozzles may be arranged to match an increasing regenerator cross-sectional area.

Figure 2:
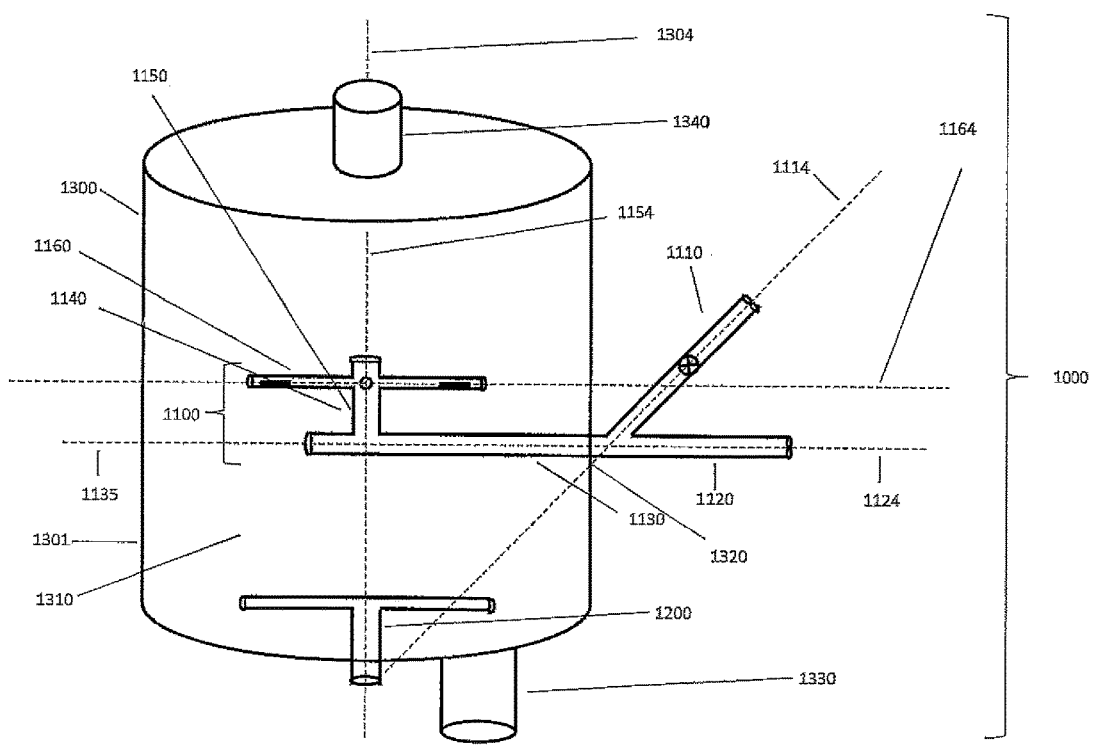
FIG. 2 is an illustration of a fluidized solids distributor system in accordance with certain embodiments of the present disclosure.

Referring now to FIG. 2, FIG. 2 illustrates a solids distributor system 1000 in accordance with certain embodiments of the present disclosure. In certain embodiments, solids distributor system 1000 may comprise solids distributor 1100 and vessel 1300.

In certain embodiments, solids distributor 1100 may comprise any combination of features discussed above with respect to solids distributor 100. In certain embodiments, solids distributer 1100 may comprise: solids standpipe 1110, gas line 1120, solids transfer line 1130, and distributor 1140. In certain embodiments, solids standpipe 1110, gas line 1120, solids transfer line 1130, and distributor 1140 are in fluid communication with each other.

In certain embodiments, solids standpipe 1110 may comprise any combination of features discussed above with respect to solids standpipe 110. In certain embodiments, not illustrated in FIG. 2, solids standpipe 1110 may comprise a first end, a valve, and a second end. In certain embodiments, solids standpipe 1110 may be positioned along a central axis 1114. In certain embodiments, central axis 1114 may comprise any combination of features discussed above with respect to central axis 114.

In certain embodiments, gas line 1120 may comprise any combination of features discussed above with respect to gas line 120. In certain embodiments, not illustrated in FIG. 2, gas line 1120 may comprise a first end and a second end. In certain embodiments, gas line 1120 may be positioned along a central axis 1124. In certain embodiments, central axis 1124 may comprise any combination of features discussed above with respect to central axis 124.

In certain embodiments, solids transfer line 1130 may comprise any combination of features discusses above with respect to solids transfer line 130. In certain embodiments, not illustrated in FIG. 2, solids transfer line 1130 may comprise a first end, a second end, and a cap. In certain embodiments, solids transfer line 1130 may be positioned along a central axis 1135. In certain embodiments, central axis 1135 may comprise any combination of features discussed above with respect to central axis 135.

In certain embodiments, distributor 1140 may comprise any combination of features discussed above with respect to distributor 140. In certain embodiments, distributor 1140 may comprise center conduit 1150 and one or more arm conduits 1160.

In certain embodiments, center conduit 1150 may comprise any combination of features discussed above with respect to center conduit 150. In certain embodiments, not illustrated in FIG. 2, center conduit 1150 may comprise a first end, a second end, and an end cap.

In certain embodiments, center conduit 1150 may be positioned along a central axis 1154. In certain embodiments, central axis 1154 may comprise any combination of features discussed above with respect to central axis 154.

In certain embodiments, distributor 1140 may comprise one, two, three, four, five, six, seven, eight, nine, ten, eleven, or twelve arm conduits 1160. In certain embodiments, each of the arms 1160 may be equispaced. In certain embodiments, arm conduits 1160 may comprise any combination of features discussed above with respect to arm conduits 160. In certain embodiments, not illustrated in FIG. 2, the one or more arm conduits 1160 may comprise first ends, second ends, and end caps. In certain embodiments, the one or more arm conduits 1160 may be positioned along a central axis 1164. In certain embodiments, central axis 1164 may comprise any combination of features discussed above with respect to central axis 164.

In certain embodiments, the one or more arm conduits 1160 may comprise slots 1165 disposed on arm conduits 1160. In certain embodiments, slots 1165 may comprise any combination of features discussed above with respect slots 165. In certain embodiments, the one or more arm conduits 1160 may comprise nozzles instead of slots 1165.

In certain embodiments, a portion of solids distributor 1100 may be disposed within vessel 1300. For example, as shown in FIG. 2, distributor 1140 and a portion of solids transfer line 1130 may be disposed within vessel 1300. In certain embodiments, a portion of solids distributor 1110 may be disposed outside of vessel 1300. For example, as shown in FIG. 2, solids standpipe 1110, gas line 1120, and a portion of solids transfer line 1130 may be disposed outside of vessel 1300. In certain embodiments, not shown in FIG. 2, a portion of solids standpipe 1110 and gas line 1120 may be disposed within vessel 1300 along with solids transfer line 1130.

In certain embodiments, vessel 1300 may be positioned along a central axis 1304. In certain embodiments, solids distributor 1100 may be positioned so as to be centered on or offset from central axis 1304.

In certain embodiments, vessel 1300 may be a fluidized bed regenerator. In certain embodiments, vessel 1300 may be any vessel suitable for use in holding fluidized solids. In certain embodiments, vessel 1300 may be an FCC regenerator used for regenerating a spent catalyst from an FCC reactor or stripper.

In certain embodiments, vessel 1300 may comprise outer walls 1301. In certain embodiments, outer walls 1301 may define an internal chamber 1310, a solids inlet 1320, vessel standpipe 1330, and vessel gas outlet 1340. In certain embodiments, solids transfer line 1130 may pass through solids inlet 1320 to allow a combined stream of solids and gas to enter into internal chamber 1310. In certain embodiments, vessel 1300 may be capable of holding the solids in the combined stream of solids and gas. In certain embodiments, vessel standpipe 1330 may allow for the solids to exit the vessel 1300. In certain embodiments, vessel gas outlet 1340 may allow for the vessel gas to exit vessel 1300.

In certain embodiments, the direction of flow through inlet 1320 may be perpendicular to outer walls 1310. In certain embodiments, the direction of flow through inlet 1320 may inclined or declined at some angle that is not perpendicular to outer walls 1301.

In certain embodiments, solids distributor system 1000 may further comprise gas grid 1200. In certain embodiments, gas grid 1200 may be disposed within internal chamber 1310 of vessel 1300. In certain embodiments, gas grid 1200 may comprise any conventional gas grid. In certain embodiments, gas grid 1200 may allow for the even distribution of gas across the vessel 1300.

In certain embodiments, solids distributor 1100 may be self-supporting. In other embodiments, solids distributor 1100 may not be self-supporting.

Figure 3:
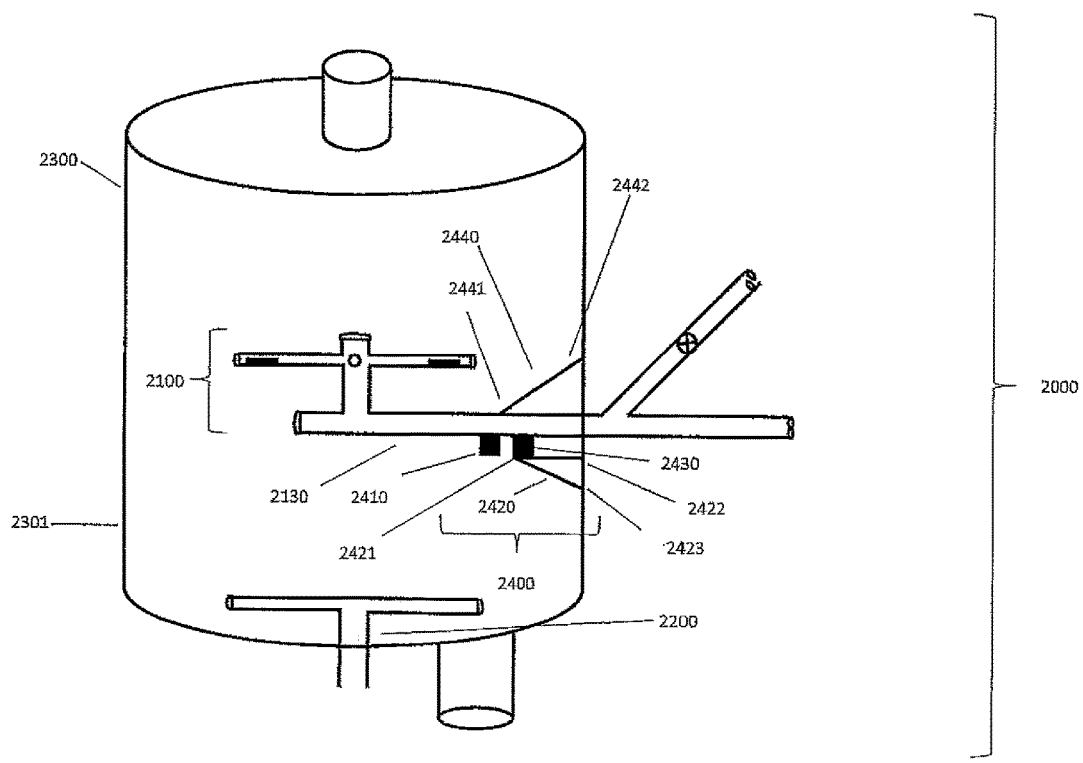
FIG. 3 is an illustration of a fluidized solids distribution system in accordance with certain embodiments, of the present disclosure.

Referring now to FIG. 3, FIG. 3 illustrates a solids distributor system 2000 in accordance with certain embodiments of the present disclosure. In certain embodiments, solids distributor system 2000 may comprise solids distributor 2100, gas grid 2200, and vessel 2300.

In certain embodiments, solids distributor 2100 may comprise any combination of features discussed above with respect to solids distributor 100 or solids distributor 1100. In certain embodiments, solids distributor 2100 may comprise a solids transfer line 2130. In certain embodiments, solids transfer line 2130 may comprise any combination of features discussed above with respect to solids transfer line 1130 and/or solids transfer line 130.

In certain embodiments, vessel 2300 may comprise any combination of features discussed above with respect to vessel 1300. In certain embodiments, vessel 2300 may comprise an outer wall 2301. In certain embodiments, outer wall 2301 may comprise any combination of features discussed above with respect to outer wall 1301.

In certain embodiments, gas grid 2200 may comprise any combination of features discussed above with respect to gas grid 1200.

In certain embodiments, solids distributor system 2000 may further comprise a support system 2400. In certain embodiments, support system 2400 may comprise any combination of supports in tension or compression. In certain embodiments, support system 2400 may comprise beams 2410, triangular trusses 2420, cross beams 2430, and tension beams 2440.

In certain embodiments, support system 2400 may comprise a beam 2410. In certain embodiments, beam 2410 may comprise any material capable of attaching solids distributor 2100 to vessel 2300. In certain embodiments, the solids transfer line 2130 of distributor 2100 may rest upon beam 2410. In certain embodiments, beam 2410 may span a chord of the vessel 2300 between a first point on the inner surface of outer wall 2301 and a second point on the inner surface of outer wall 2301. In certain embodiments, a first end of beam may be connected to the first point on the inner surface of outer wall 2301 and a second end of beam 2410 may be connected the second point on the inner surface of outer wall 2301.

In certain embodiments, support system 2400 may comprise one, two, three, four, or five triangular trusses 2420 and a cross beam 2430. In certain embodiments, triangular trusses 2420 and cross beam 2430 may comprise any material capable of attaching solids distributor 2100 to vessel 2300. In certain embodiments, cross beam 2430 may be attached to nodes 2421 of triangular trusses 2420. In certain embodiments, the solids transfer line 2130 of distributor 2100 may rest upon cross beam 2430. In certain embodiments, first ends 2422 of triangular trusses 2420 and second ends 2423 of triangular trusses 2420 may be connected to an inner surface of outer wall 2301.

In certain embodiments, support system 2400 may comprise a tension beam or rod 2440. In certain embodiments, tension beam or rod 2440 may comprise any material capable of attaching solids distributor 2100 to vessel 2300. In certain embodiments, a first end 2441 of tension beam or rod 2440 may be connected to solids transfer line 2130. In certain embodiments, a second end 2442 of tension beam or rod 2440 may be connected to an inner surface of outer wall 2301.

In certain embodiments, the present disclosure provides a method of distributing fluidized solids comprising: providing a solids distributor system, wherein the solids distributor system comprises a vessel and a solids distributor disposed within the vessel, wherein the solids distributor comprises: a solids standpipe; a gas line; a solids transfer line in fluid communication with the solids standpipe and the gas line; and a distributor in fluid communication with the solids transfer line and introducing a flow of solids and gas into the vessel.

In certain embodiments, the solids distributor system may comprise any solids distributor system discussed above. In certain embodiments, the solids distributor may comprise any solids distributor discussed above. In certain embodiments, the solids distributor may comprise a spent catalyst distributor for an FCC regenerator. In certain embodiments, the vessel may comprise any vessel discussed above. In certain embodiments, the vessel may comprise an FCC regenerator.

In certain embodiments, introducing a flow of solids and gas into the vessel may comprise introducing a flow of gas into the solids distributor. In certain embodiments, introducing a flow of gas into the solids distributor may comprise introducing a flow of gas into the gas line of the solids distributor. In certain embodiments, the flow of gas may be a flow of gas from a blower or compressor.

In certain embodiments, introducing a flow of solids and gas into the vessel may comprise introducing a flow of solids into the solids distributor. In certain embodiments, introducing a flow of solids into the solids distributor may comprise introducing a flow of solids into the solids standpipe of the solids distributor. In certain embodiments, the flow of solids may be a flow of spent catalyst from an FCC reactor or stripper.

In certain embodiments, introducing a flow of solids and gas into the vessel may comprise combining a flow of solids and a flow of gas and introducing the combined flow of solids and gas into the vessel. In certain embodiments, the flow of solids and the flow of gas may be combined by introducing the flow of gas into the gas line of the solids distributor simultaneously with introducing the flow of solids into the solids standpipe of the solids distributor. In certain embodiments, the combined flow of solids and gas may be introduced into the vessel after passing through the solids transfer line and the distributor. In certain embodiments, the combined flow of solids and gas may flow through one or more slots of the distributor. In certain embodiments, the method may further comprise regenerating the spent catalyst in the vessel.

To facilitate a better understanding of the present invention, the following examples of specific embodiments are given. In no way should the following examples be read to limit, or to define, the scope of the invention.

EXAMPLES

Computer simulations were conducted to test the distribution characteristics and mixing properties of a solids distributor in accordance with certain embodiments of the present disclosure. For demonstration purposes, the type of solids distributor that chosen was a spent catalyst distributor for an FCC regenerator. Simulations were carried out that compared the performance for the spent catalyst distributor in accordance with certain embodiments of the present disclosure to the performance of a conventional spent catalyst distributor.

For each of the configurations, a simulation was done introducing spent catalyst particles into a fluidized bed system. The geometry and flow rates were representative of typical FCC regenerator operations. The spent catalyst addition rate to the bed was fixed at 400 kg/s, while air addition rates to the distributor device were varied in the range from 5 m/s to 15 m/s, and regenerator bed operating conditions were held constant.

Simulations measured the regenerator bed mixing efficiency of the spent catalyst inlet device, residence time of particles in the regenerator bed, as well as distribution of spent catalyst within the spent catalyst distribution device arms.

Figure 4:
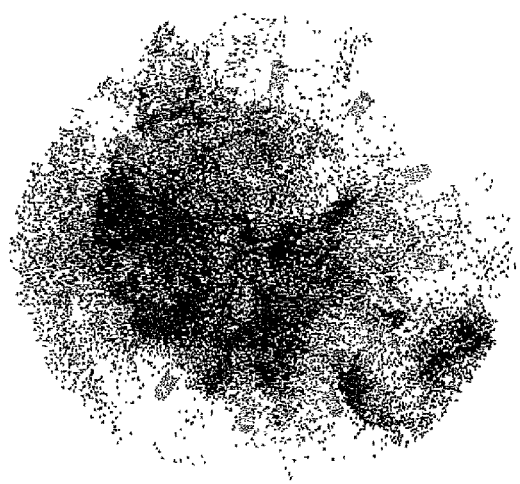
FIG. 4 illustrates the mixing efficiency of fluidized solids distributors.
Figure 4:
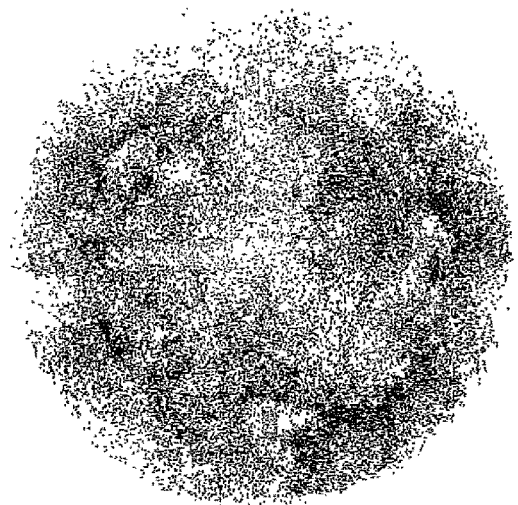

Illustrations of the mixing efficiency of both simulations are shown in FIG. 4. Each image shows the distribution of a pulse of spent catalyst particles in the bed after a fixed number of seconds in the regenerator bed. The first image (existing SCD technology) shows the outcome when the conventional spent catalyst distributor was used and the second image (new designed SCD) shows the outcome when a spent catalyst distributor in accordance with certain embodiments of the present disclosure was used. As can be seen in FIG. 4, the distribution of spent catalyst particles across the cross section of the regenerator is considerably improved by using the spent catalyst distributor in accordance to certain embodiments of the present disclosure.

Thus, the results show that the fluidized solids distributors disclosed herein, and represented by a spent catalyst distributor in the simulations, perform at a higher level than conventional fluidized solids distributors.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A solids distributor system comprising:
    a vessel and
    a solids distributor disposed within the vessel, wherein the solids distributor comprises a side entry spent catalyst distribution system comprising:
        a solids standpipe positioned along a first central axis;
        a gas line positioned along a second central axis;
        a solids transfer line in fluid communication with the solids standpipe and the gas line and positioned along a third central axis;
        a center conduit;
        a distributor in fluid communication with the center conduit positioned along a fourth central axis and in fluid communication with the solids transfer line, the distributor comprising one, two, three, four, five, six, seven, eight, nine, ten, eleven, or twelve conduit arms and each of the arms comprising slots disposed on the bottom of the arms;
        wherein the fourth central axis is inclined or declined at an angle in the range of from 45 to 90 degrees with respect to the third central axis; and
        a gas grid disposed within the internal chamber of the vessel.

2. The solids distributor system of claim 1, wherein the distributor comprises four arms.

3. The solids distributor system of claim 1, wherein the arms comprise open ends.

4. The solids distributor system of claim 1, wherein the slot has a tapered geometry.

5. The solids distributor system of claim 1, wherein the vessel comprises an FCC regenerator.

6. The solids distributor system of claim 1, further comprising a support system.

7. The solids distributor system of claim 6, wherein the support system comprises beams, triangular trusses, cross beams, or tension beams.

8. A method of distributing fluidized solids comprising:
    providing a solids distributor system, wherein the solids distributor system comprises a vessel and a solids distributor disposed within the vessel, wherein the solids distributor comprises a side entry spent catalyst distribution system comprising: a solids standpipe positioned along a first central axis; a gas line positioned along a second central axis; a solids transfer line in fluid communication with the solids standpipe and the gas line and positioned along a third central axis; and a distributor in fluid communication with a center conduit positioned along a fourth central axis and in fluid communication with the solids transfer line, the distributor comprising one, two, three, four, five, six, seven, eight, nine, ten, eleven, or twelve conduit arms and each of the arms comprising slots disposed on the bottom of the arms;
        wherein the fourth central axis is inclined or declined at an angle in the range of from 45 to 90 degrees with respect to the third central axis;
        a gas grid disposed within the internal chamber of vessel, and
    flowing solids and gas through the solids distributor into the vessel.

9. The method of claim 8, wherein the solids distributor system comprises the solids distributor system of claim 1.

* * * * *